Feb. 17, 1931.  M. I. FLOWERS  1,793,361
GIN SAW FILER
Filed May 9, 1928  4 Sheets-Sheet 1

M. I. Flowers
Inventor
By C. A. Snow & Co.
Attorneys.

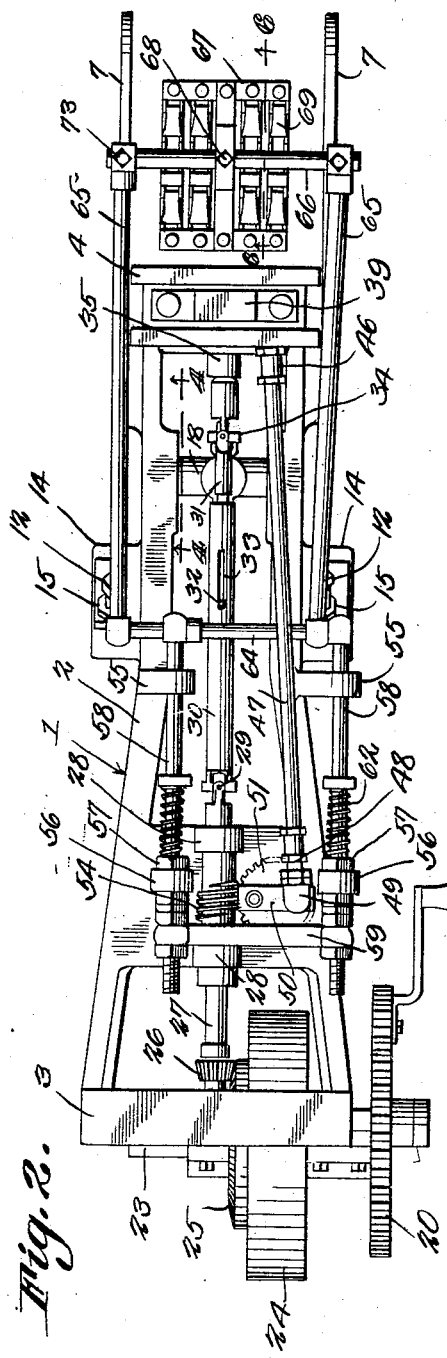
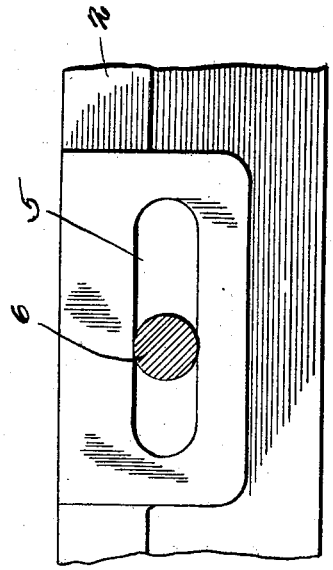
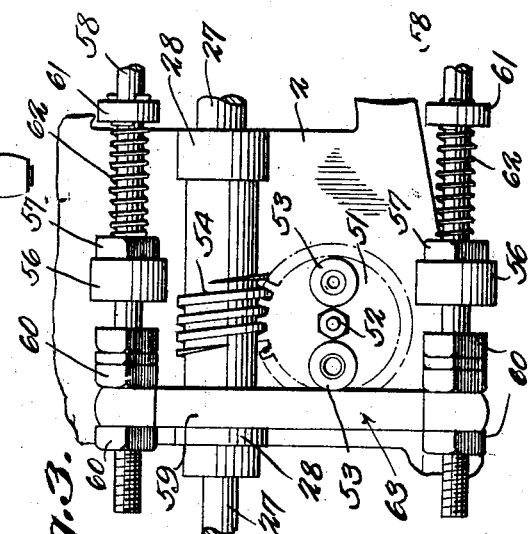

Feb. 17, 1931.  M. I. FLOWERS  1,793,361
GIN SAW FILER
Filed May 9, 1928    4 Sheets-Sheet 3
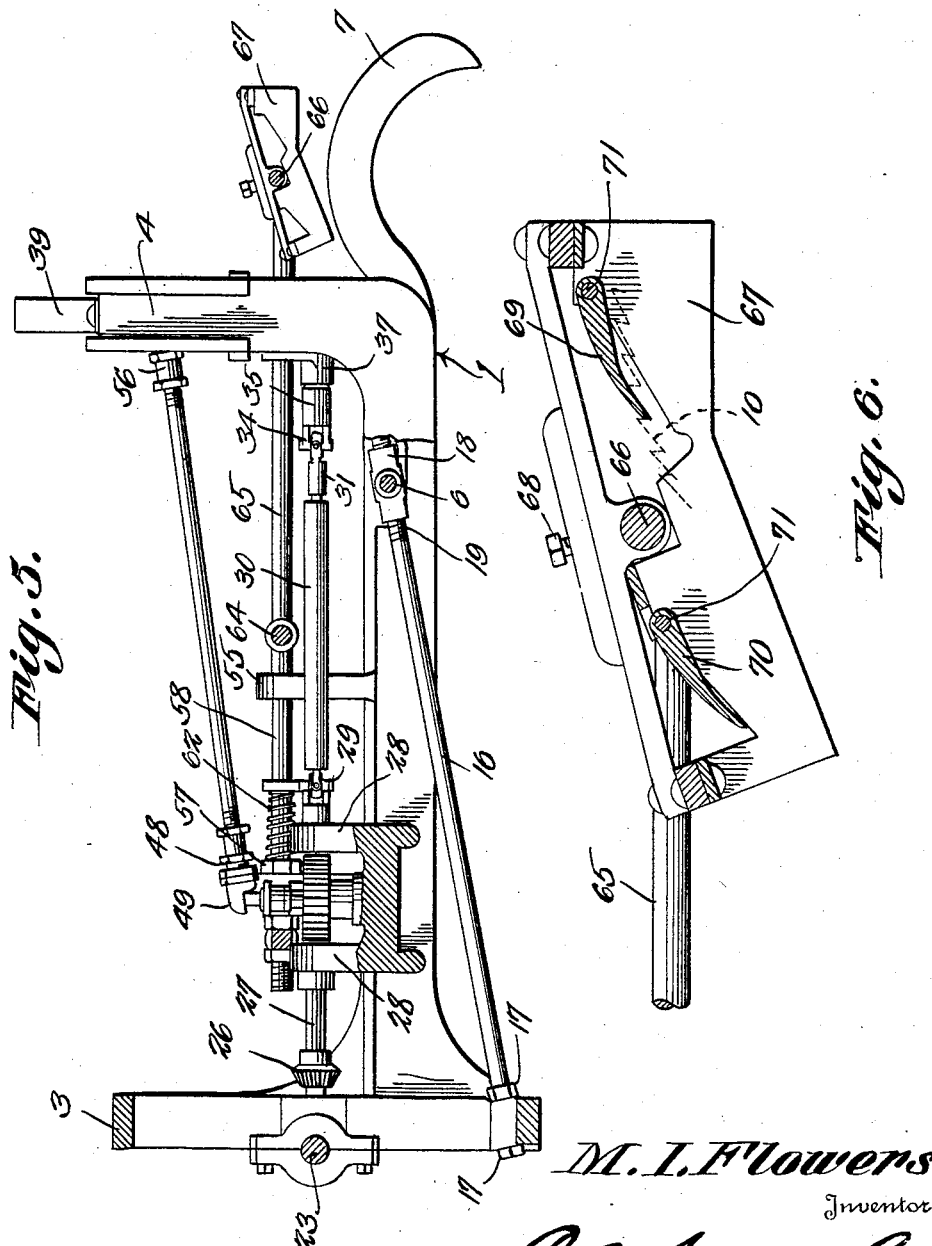

Feb. 17, 1931.                    M. I. FLOWERS                    1,793,361
                                   GIN SAW FILER
                              Filed May 9, 1928           4 Sheets-Sheet 4
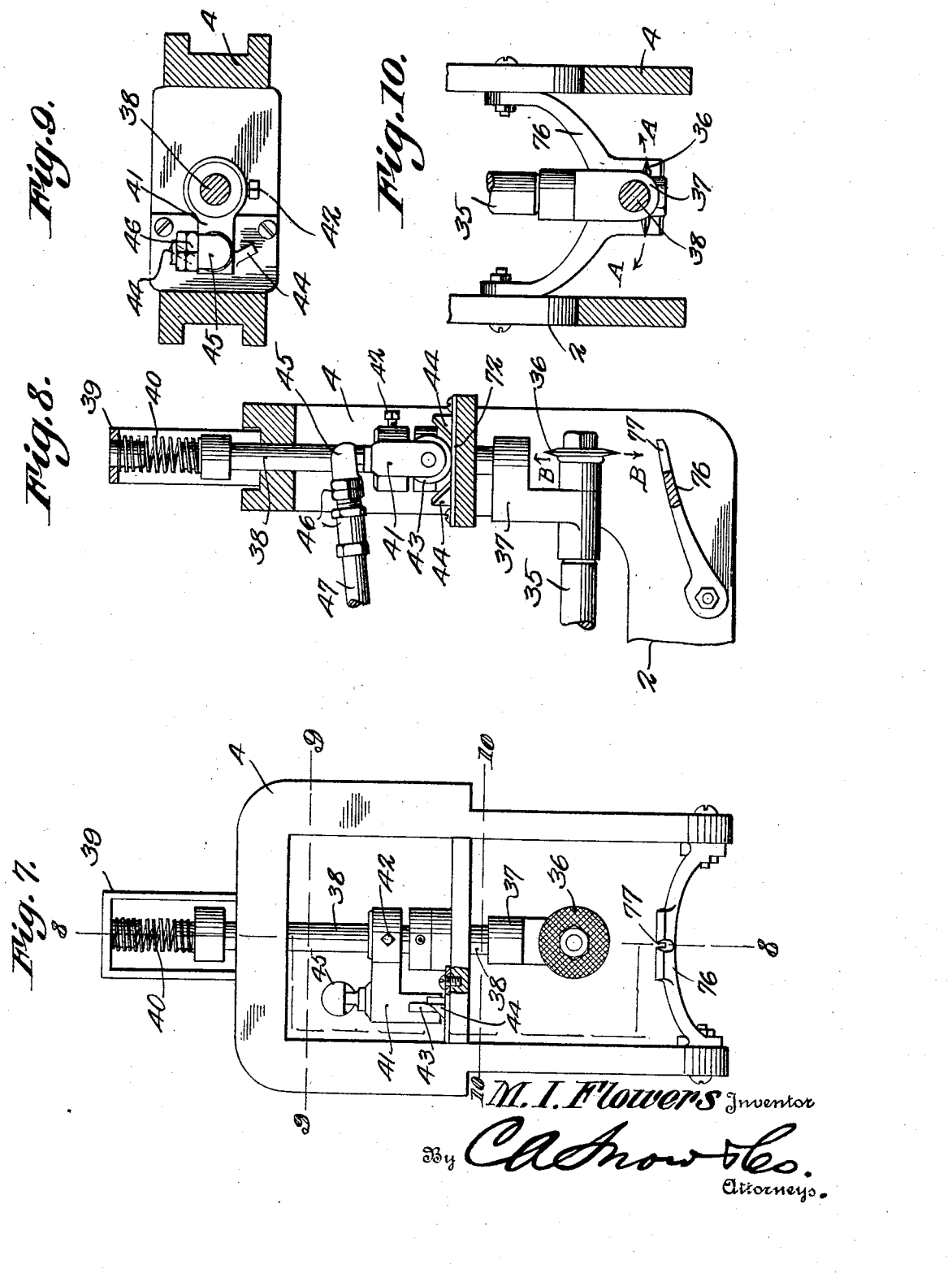

Patented Feb. 17, 1931

1,793,361

UNITED STATES PATENT OFFICE

MALON I. FLOWERS, OF WAELDER, TEXAS

GIN-SAW FILER

Application filed May 9, 1928. Serial No. 276,324.

The device forming the subject matter of this application is adapted to be used for sharpening gin saws, and one object of the invention is to provide a machine of the class described which may be employed for filing a round edged tooth on a gin saw through the operation of a rotary file or grinder. Another object of the invention is to provide novel means for shifting the saw to bring one tooth of the saw, after another, into the field of operation of the grinder. The invention aims, further to provide a device which will put a somewhat curved throat between the teeth, as distinguished from an angular or sharply defined throat. A further object of the invention is to provide a device of the class described which will operate more rapidly than other gin saw filers. The invention aims to provide novel means for lifting the rotary grinder, so that the saw may be shifted to bring another tooth of the saw into operative relation to the grinder.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 2 is a top plan;

Figure 3 is a fragmental plan view illustrating the means whereby movement is imparted to the slide;

Figure 4 is a section detail illustrating certain structural features of the supports which carry one end of the machine;

Figure 5 is a longitudinal section;

Figure 6 is a longitudinal section taken through the pawl rack;

Figure 7 is an elevation showing the forward end of the machine;

Figure 8 is a section taken approximately on the line 8—8 of Figure 7;

Figure 9 is a section taken approximately on the line 9—9 of Figure 7;

Figure 10 is a section taken approximately on the line 10—10 of Figure 7.

Figure 1:
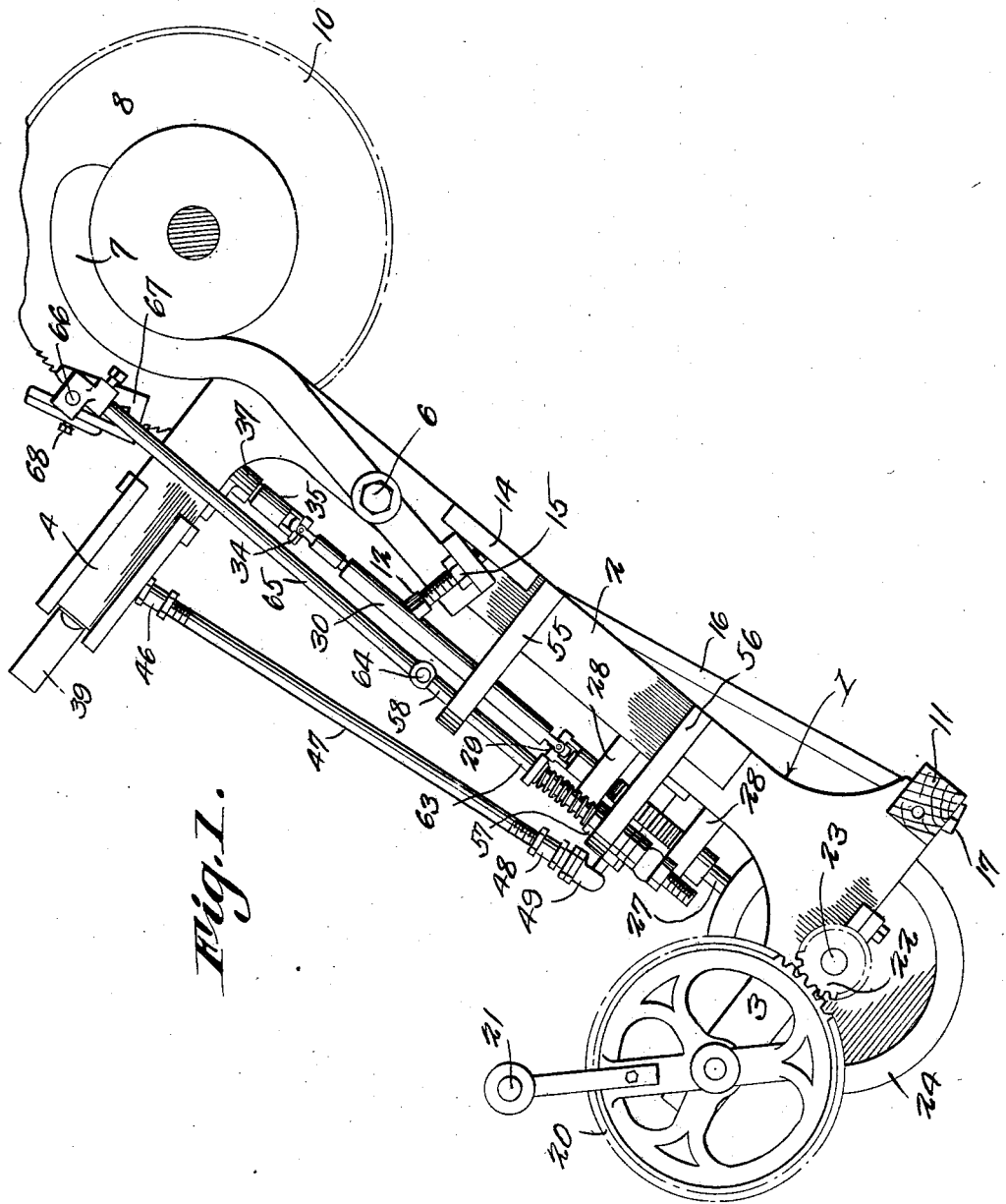
Figure 1 shows, in side elevation, a device constructed in accordance with the invention.

The device forming the subject matter of this application comprises a frame 1, which may be constructed in various ways without departing from the spirit. The frame 1, as shown, includes a longitudinal body 2 provided at its rear extremity with a transverse end member 3, and at its forward extremity with an upstanding transverse end member 4. A means is supplied for supporting the forward end of the frame 1 properly with respect to the gin saw 10, as shown in Figure 1. Having this consideration in mind, elongated slots 5 are formed in the sides of the body 2, as Figure 4 will show, and in the slots 5, pivot elements 6 are located, inner ends of the pivot elements being mounted in a nut 18 disposed within the body 2 of the frame 1.

Hook shaped supports 7 are fulcrumed intermediate their ends on the pivot elements 6, to swing vertically, the supports 7 being adapted to engage the hubs or spacers 8 which are mounted between the gin saws 10, on the shaft 9 which carries the gin saws. The rear end 11 (Figure 1) of the machine may be supported in any desired way. Adjusting screws 12 are threaded into the rear ends of the supports 7 and bear upon ledges 14 which extend outwardly from the sides of the body 2 of the main frame 1. Lock nuts 15 on the screws 12 hold the screws in any position to which the screws may have been adjusted lengthwise, the lock nuts 15 cooperating with the ledges 14. A connection 16, in the form of a rod, is threaded at its forward end, as shown at 19, into the nut 18 which is carried by the pivot elements 6. The rear end of the connection 16 turns freely in the rear end of the frame 1 but is held against longitudinal movement therein by spaced shoulders 17 (Figure 5) mounted on the connection 16, a portion of the main frame work of the machine being located between the shoulders 17.

As to the driving mechanism, a gear wheel 20 is journaled on the end member 3 of the frame 1, and is operated in any suitable way, for instance, by means of a handle 21. The gear wheel 20 meshes with a pinion 22 on a transverse shaft 23 supported for rotation on the end member 3 of the frame. A fly wheel 24 is secured to the shaft 23, and on the inner side of the fly wheel there is a bevelled gear 25.

Figure 2 discloses that the bevelled gear 25 meshes with a bevelled pinion 26 on a longitudinal shaft 27 journaled in upstanding bearings 28 located on the body 2 (Figure 2) near to the longitudinal center of the machine. The forward end of the shaft 27 is connected by a universal joint 29 to a sleeve 30. A connection 31, in the form of a rod, is mounted to slide longitudinally in the sleeve 30, but the connection of rod 31 and the sleeve 30 rotate together, because the connection 31 carries a cross pin 32 received in longitudinal slots 33 in the sleeve 30. A universal joint 34 unites the forward end of the connection 31 with a shaft 35. On the forward end of the shaft 35 there is a grinding disc or file 36, and Figures 8 and 10 show that the grinding disc 36 is disposed above a cross piece 76, extended across the body 2 of the frame 1 and provided in its forward edge with a notch or seat 77.

The numeral 37 marks a bearing in which the forward portion of the shaft 35 is journaled. The bearing 37 is mounted on the lower end of a shaft 38 disposed approximately at right angles to the body 2 of the frame 1. The shaft 38 is journaled for rotation in the end member 4 of the frame 1, and the shaft can move in the direction of its length in the end member 4. A housing 39 is mounted on the upper end of the frame member 4, and in the housing 39, the upper end of a compression spring 40 is held.

The lower end of the spring 40 is engaged with the upper end of the longitudinally movable shaft 38, as may be seen from Figure 8 and the spring 40 tends to carry the shaft 38, the forward end of the shaft 35, and the grinder 36 downwardly. A means is provided for carrying the shaft 38 and the grinder 36 upwardly, and this means includes an angular arm 41 which is adjustably secured at 42 to the shaft 38, as shown in Figure 7. A roller 43 is journaled on the arm 41 and is adapted to roll along a wear plate 72 on the frame member 4, the wear plate carrying spaced lifting cams 44.

The shaft 38 is rotated for two purposes: First, to swing the grinding disc 36 across the edge of the tooth of the gin saw, so as to rounded off the edge of the tooth; and second, to cause the roller 43 to ride up on the lifting cams 44, thereby raising the grinding disc 36 so that another tooth on the gin saw 10 may be advanced into place to be filed or ground. The means for rotating the shaft 38 as and for the purpose described, includes a pitman 47 united by a universal joint 45 (Figure 8) with the arm 41 (Figure 7) on the shaft 38. The universal joint 45 is adjustably connected at 46 to the pitman 47, so that the effective length of the pitman may be varied. For a similar purpose, an adjustable connection 48 (Fig. 2) unites the rear end of the pitman 47 with a universal joint 49 connected to a crank block 50 seen best in Figure 2. The crank block 50 is connected to a pinion 51, in spaced relation thereto, the crank block having been removed in Figure 3 of the drawings.

The pinion 51 is journaled at 52 on the part 2 of the main frame of the machine. Rollers 53 (Figure 3) are supported for rotation between the crank block 50 and the pinion 51. A worm 54 is secured to the shaft 27, between the bearings 28 for the said shaft, the worm meshing with the pinion 51. Standards 55 and 56 (Fig. 1) are mounted in transversely spaced relation (Figure 2) on the body 2 of the frame. Bearings 57 are mounted in the standards 56.

The machine includes a slide, which as a whole, is designated by the numeral 63. The slide 63 comprises parallel rods 58 united at their rear ends by a cross head 59. The cross head can be shifted longitudinally of the rods 58, and nuts 60 on the rods 58 hold the cross head 59 in any position to which it may have been adjusted. Figure 3 shows that the rollers 53 on the pinion 51 are adapted to engage one at a time with the cross head 59 of the slide 63. The rods 58 of the slide 63 are mounted to reciprocate in the standards 55 and in the bearings 57 which are mounted in the standards 56. The rollers 53, cooperating with the cross head 59, carry the slide 63 rearwardly, that is, to the left in Figures 2 and 3. A spring means is provided for carrying the slide 63 in an opposite direction, the said means embodying compression springs 62 on the rods 58. The forward ends of the compression springs 62 engage abutments 61 on the rods 58, and the rear ends of the springs bear against the members 57 which support the rods 58 slidably in the standards 56.

A transverse shaft 64 (Figures 2 and 1) is mounted to rock in the forward ends of the rods 58 that form part of the slide 63. The rear ends of links 65 are mounted on the shaft 64, and the construction is such that the links 65 can swing parallel to the gin saws 10 (Fig. 1). A cross rod 66 is held by set screws 73 in the forward ends of the links 65.

The links 65 and the cross rod 66 may be called a support, because the rod 66 forms a mounting for a pawl carrier 67, the carrier 67 being mounted intermediate its ends on the rod 66, as Figure 6 will show. A set screw 68 is threaded into the upper portion of the pawl carrier 67 and is adapted to engage the cross rod 66 to hold the pawl carrier 67 in any position to which it may have been tilted upon the cross rod. Forward pawls 69 and rear pawls 70 are mounted pivotally, as shown at 71, on the pawl carrier 67, for vertical swinging movement, the pawls being adapted to cooperate with several of the gin saws.

As to the general operation of the machine, the shaft 35 is rotated, rotation being imparted to the grinding disc 36, the tooth of the gin saw 10 being ground or filed accordingly. The shaft 35 can swing transversely, because it is mounted on the shaft 38 (Figure 8), and the disc 36 oscillates in an arc as shown by the arrows a in Figure 10, the result being that the edge of the tooth of the gin saw is rounded off as the tooth is sharpened. The disc 36 can be moved at right angles to its axis of rotation, because the shaft 38 which carries the bearing 37 and the shaft 35, has movement in the direction of its length. This operation carries the grinding disc or file 36 lengthwise of the edge of the tooth, and also raises the disc 36 high enough so that, at the proper time, the next tooth of the gin saw 10 can be brought into place to be ground. The rotation of the gin saws 10 is brought about by the action of the pawl 69—70, when the pawl carrier 67 is reciprocated. The periphery of the saw moves through the notch 77 in the cross piece 76 (Figures 8 and 10) and, thus, the saw is steadied whilst it is being filed. The supports 7 can be shifted longitudinally by means of the rotatable rod 16 which is threaded at 19 into the nut 18 connected by the pivot elements 6 with the supports 7, the rod 16 being held in the end member 3 of the frame for rotation, but against longitudinal movement, by the shoulders 17 (Figure 5). Moreover, the supports 7 can be tilted on their fulcra 6 by the means of the screws 12 (Figure 1).

Because the supports 7 can be shifted as aforesaid with respect to the frame 1, the position of the frame 1, and the position of the filing disc 36, with respect to the teeth of the gin saw, can be changed, and the operator can change the shape of the tooth accordingly, the exact shape of the tooth being a point upon which ginners have their own peculiar views.

The drives will now be traced out.

The gear wheel 20 is rotated by means of the handle 21, the gear wheel 20 imparting rotation to the shaft 23 by means of the pinion 22. The shaft 23 rotates the shaft 27 through the instrumentality of the bevelled gear 25 and the bevelled pinion 26, the fly wheel 24 promoting a smooth and even rotation of the shaft 27. From the shaft 27, rotation is imparted to the sleeve 30, by way of the universal joint 29. The pin 32 and the slots 33 impart rotation from the sleeve 30 to the connecting rod 34, the universal joint 34 transmitting rotation to the shaft 35, and the shaft 35 rotating the grinding disc 36.

When the shaft 27 is rotated, the worm 54, cooperating with the pinion 51, causes the crank block 50 to rotate, and since the pitman 47 is connected by the universal joint 49 to one end of the crank block 50, the pitman moves endwise and swings the arm 41 of Figure 7, thereby to rotate or oscillate the shaft 38. When the shaft 38 is oscillated, the roller 43 rides up and down on the lifting cams 44, thereby imparting longitudinal movement to the shaft 38 and moving the grinding disc 36 in the direction of the arrows B in Figure 8.

The weight of the parts attached to the shaft 38 generally may be regarded as ample to carry it downwardly, but the spring 40 will do this in any event. The especial function of the spring 40 is to hold the roller 43 down on the wear plate 72 so that there will be no lost motion at this point and so that the roller will always be in a position to cooperate properly with the lifting cams 44.

When the pinion 51 (Figure 3) is rotated by means of the worm 54 on the shaft 27, the rollers 53, one after another, engage the cross head 59 of the slide 63 and retract the slide. The slide is advanced by the springs 62. When the slide is retracted, the links 65 and the cross rod 66 move the pawl carriers 67 to the left in Figure 1 and the gin saws 10 are turned so that a new tooth on the gin saw which is being filed, is moved into the path of the grinding disc 36. Whilst the gin saws are being rotated to bring up a new tooth, the grinding disc 36 has been lifted clear of the teeth of the saws by the roller 43 on the arm 41 of the shaft 38 and the lifting cams 44. The springs 62 move the pawl carrier 67 to the right in Figure 5 and enable the pawls 69—70 to get a new hold on the gin saw teeth. Because the rear ends of the links 65 are pivotally connected at 64 with the forward ends of the rods 58 of the slide 63, the pawl carrier 67 has a movement in a direction parallel to the gin saws 10, and the pawls on the pawl carrier can cooperate properly with the gin saws.

What is claimed is:—

1. In a device for sharpening gin saw teeth, a rotary sharpener, means for supporting a gin saw in such position that one edge of one of its teeth will be disposed in the path of the sharpener, means for rotating the sharpener about an axis; and mechanism for rounding off said edge, comprising means for swinging the sharpener in an arc transverse to said edge and means for simultaneously moving the sharpener longitudinally of said edge.

2. In a device for sharpening gin saw teeth, means for supporting a gin saw in position to be ground, a sharpener, and means for moving the sharpener in an arc across one edge of the saw tooth that is being sharpened, transversely of said edge, and in engagement with said edge, thereby to effect a rounding of said edge, and means for moving the sharpener clear of said edge as the rounding thereof is completed.

3. In a device for sharpening gin saw teeth, a frame, a first shaft mounted in the frame for rocking movement about the axis of the shaft, and for longitudinal sliding movement in the direction of its length, a flexible second shaft journaled on the frame and on the first shaft, a sharpener carried by the second shaft, the first shaft constituting means for imparting swinging movement to the sharpener in an arc about the axis of the first shaft when the first shaft is rocked, cooperating cams on the frame, an arm on the first shaft, the arm having means for engaging the cams to impart longitudinal movement to the first shaft and to move the sharpener longitudinally of the tooth which is being ground, a rotary member journaled on the frame, means for operating the rotary member from the second shaft, and a pitman pivoted to the arm, the pitman being pivoted eccentrically to the rotary member in such relation to the rotary member and to the cams as to swing the sharpener in an arc about the axis of the first shaft before the cams have operated to move the sharpener out of engagement with the tooth which is being ground.

4. In a device for sharpening gin saw teeth, a frame, a shaft mounted in the frame for rocking movement about the axis of the shaft and for longitudinal sliding movement in the direction of the length of the shaft, a sharpener, means for mounting the sharpener on the shaft for swinging movement in an arc about the axis of the shaft when the shaft is rocked, cooperating cams on the frame, an arm on the shaft, the arm having means for engaging the cams to impart longitudinal movement to the shaft and to move the sharpener longitudinally of the tooth which is being ground, a rotary member journaled on the frame, and a pitman pivoted to the arm, the pitman being pivoted eccentrically to the rotary member in such relation to the rotary member and to the cams as to swing the sharpener in an arc about the axis of the shaft before the cams have operated to move the sharpener out of engagement with the tooth which is being ground.

5. In a device for sharpening gin saw teeth, a frame, a shaft mounted in the frame for rocking movement about the axis of the shaft and for longitudinal sliding movement in the direction of the length of the shaft, a sharpener, means for mounting the sharpener on the shaft for swinging movement in an arc about the axis of the shaft when the shaft is rocked, cooperating members on the frame and on the shaft for imparting longitudinal movement to the shaft when the shaft is rocked, thereby to move the sharpener longitudinally of the tooth which is being ground, and mechanism for imparting rocking movement to the shaft before said cooperating members have moved the sharpener out of engagement with the tooth which is being ground, thereby to effect a rounding of the edge of the tooth whilst the sharpener is moving longitudinally of the tooth.

In testimony that I claim the foregoing as my own, I have hereto affixed my signature.

MALON I. FLOWERS.